US011894624B2

(12) United States Patent
Sampo

(10) Patent No.: US 11,894,624 B2
(45) Date of Patent: Feb. 6, 2024

(54) SLOTTED PATCH ANTENNA

(71) Applicant: YOKOWO CO., LTD., Tokyo (JP)

(72) Inventor: Takeshi Sampo, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 0 days.

(21) Appl. No.: 17/511,585

(22) Filed: Oct. 27, 2021

(65) Prior Publication Data

US 2022/0052456 A1 Feb. 17, 2022

Related U.S. Application Data

(63) Continuation of application No. 16/491,776, filed as application No. PCT/JP2018/008168 on Mar. 2, 2018, now Pat. No. 11,233,329.

(30) Foreign Application Priority Data

Mar. 8, 2017 (JP) ................................ 2017-043786

(51) Int. Cl.

| | |
|---|---|
| ***H01Q 9/04*** | (2006.01) |
| ***H01Q 5/35*** | (2015.01) |
| ***H01Q 1/28*** | (2006.01) |
| ***H01Q 13/10*** | (2006.01) |

(52) U.S. Cl.
CPC ........... *H01Q 9/0435* (2013.01); *H01Q 1/288* (2013.01); *H01Q 5/35* (2015.01); *H01Q 13/10* (2013.01)

(58) Field of Classification Search
CPC ........... H01Q 9/0435; H01Q 5/35; H01Q 1/38
See application file for complete search history.

(56) References Cited

U.S. PATENT DOCUMENTS

2015/0069134 A1* 3/2015 Westrick .............. H01Q 9/0407 343/843
2016/0211581 A1 7/2016 Sampo et al.
2018/0301798 A1 10/2018 Ikeda et al.

FOREIGN PATENT DOCUMENTS

CN 104319474 A 1/2015
CN 102820534 B * 4/2015
(Continued)

OTHER PUBLICATIONS

International Search Report and Written Opinion dated Apr. 24, 2018 for PCT/JP2018/008168 filed on Mar. 2, 2018, 6 pages including English Translation of the International Search Report.
(Continued)

*Primary Examiner* — Dieu Hien T Duong
(74) *Attorney, Agent, or Firm* — XSENSUS LLP

(57) ABSTRACT

A slotted patch antenna includes a dielectric substrate, a radiation electrode which is provided on a major surface of the dielectric substrate, and a ground conductor which is disposed on a surface that is opposite to the major surface. The radiation electrode is formed with a slots having at least one of a meandering portion, a curve portion, or a folded portion. An external shape of the radiation electrode is a square, and totally two pairs of slots are formed inside the square, each of the slots being along respective sides of the square. Each of the slots is arranged so as to be line-symmetrical with respect to an axis of symmetry that is parallel with one of the sides of the square and passes through a center of the square, and to be point-symmetrical with respect to the center of the square.

5 Claims, 9 Drawing Sheets

(56) References Cited

FOREIGN PATENT DOCUMENTS

| | | | | | |
|---|---|---|---|---|---|
| CN | 105789875 | A | * | 7/2016 | ............... H01Q 1/36 |
| CN | 106096707 | A | * | 11/2016 | ....... G06K 19/07773 |
| DE | 10 2004 050 598 | A1 | | 4/2006 | |
| JP | 2002-43832 | A | | 2/2002 | |
| JP | 2010-103871 | A | | 5/2010 | |
| JP | 2015-19132 | A | | 1/2015 | |
| KR | 10-0734005 | B1 | | 6/2007 | |
| WO | 2016/092794 | A1 | | 6/2016 | |

OTHER PUBLICATIONS

Maci et al., "Dual-Frequency Patch Antennas", IEEE Antennas and Propagation Magazine, vol. 39, No. 6, Dec. 1997, pp. 13-20.

Chinese Office Action dated Apr. 26, 2020, issued in corresponding Chinese Patent Application No. 201880016648.4.

Extended European Search Report dated Nov. 20, 2020 in the corresponding European patent application No. 18763281.5.

Japanese Office Action dated Aug. 31, 2021, in corresponding Japanese Patent Application No. 2019-504553, 6 pp.

Faycel Fezai, "Low Profile Dual-band Circularly Polarized Microstrip Antenna for GNSS Application", 4 pages, IEEE Xplore, Apr. 2015, (Year: 2015).

Office Action dated Jun. 21, 2022, in corresponding European patent Application No. 18763281.5, 8 pages.

Jianling Chen et al., "A Dual-Band Dual-Polarization Slot Patch Antenna for GPS and Wi-Fi Applications", IEEE Antennas and Wireless Propagation Letters, vol. 15, 2016, Jun. 22, 2015, pp. 406-409.

* cited by examiner

RIGHT-HANDED CIRCULARLY POLARIZED WAVES, 1,210 MHz

WITH MEANDERING PORTIONS

RIGHT-HANDED CIRCULARLY POLARIZED WAVES, 1594 MHz
WITH MEANDERING PORTIONS

RIGHT-HANDED CIRCULARLY POLARIZED WAVES, 1,210 MHz
WITH MEANDERING PORTIONS

RIGHT-HANDED CIRCULARLY POLARIZED WAVES, 1,594 MHz

WITH MEANDERING PORTIONS

SLOTTED PATCH ANTENNA

CROSS-REFERENCE TO RELATED APPLICATIONS

The present application is a continuation of U.S. application Ser. No. 16/491,776, filed Sep. 6, 2019, which is based on PCT filing PCT/JP2018/008168, filed Mar. 2, 2018, which claims priority to JP 2017-043786, filed Mar. 8, 2017, the entire contents of each are incorporated herein by reference.

TECHNICAL FIELD

The present invention relates to a slotted patch antenna which operates in two different transmission/reception bands.

BACKGROUND ART

The use of a patch antenna capable of dealing with circularly polarized radio waves is common in antenna devices for satellites, for example, for GNSS (Global Navigation Satellite System). On the other hand, demand for provision of another transmission/reception band in addition to one that is determined by the external shape of a radiation electrode of a patch antenna has arisen in recent years.

Slotted patch antennas have been proposed to attain the above object. FIG. 12 shows a conventional slotted patch antenna (a ground plate is omitted). As shown in this figure, a slotted patch antenna 5 is equipped with a square dielectric substrate 10, a square radiation electrode 20 which is a planar conductor provided on a major surface of the dielectric substrate 10, and a ground plate (ground conductor; not shown) disposed on the surface opposite to the major surface. Furthermore, the radiation electrode 20 is formed with two pairs of straight slots 30. The slots 30 are portions where no conductor exists. The radiation electrode 20 is fed by a two-point feeding in which a power is fed at two points, that is, feeding points a and b, so that circularly polarized waves can be transmitted and received efficiently. As disclosed in the following Patent document 1, in patch antennas, a good axial ratio can be obtained in a wide frequency range by feeding signals that are different from each other in phase by 90° to two feeding points.

As such, the slotted patch antenna 5 shown in FIG. 12 has two transmission/reception bands, that is, a transmission/reception band that is determined by external dimensions of the radiation electrode 20 (i.e., a transmission/reception band of a patch antenna operation) and a transmission/reception band of a slot antenna that is determined by the length of the slots 30 formed in the radiation electrode 20 (i.e., a transmission/reception band of a slot antenna operation).

CITATION LIST

Patent Literature

Patent document 1: JP-A-2015-19132

Non-Patent Literature

Non-patent document 1: "Dual-Frequency Patch Antennas," S. Maci and G. Biffi Gentili, 1045-9243/97, 1997 IEEE.

Non-patent document 1 discloses the slotted patch antenna shown in FIG. 12.

SUMMARY OF INVENTION

Technical Problem

In the conventional slotted patch antenna 5 shown in FIG. 12, in the original patch antenna operation using the radiation electrode 20, the effect of increasing the electrical length of the radiation electrode 20 due to the permittivity of the dielectric substrate 10 is large (i.e., the area of the portion, in contact with the radiation electrode 20, of the dielectric substrate 10 is large). In contrast, in the slot antenna operation using the straight slots 30, the effect of increasing the electrical length of the radiation electrode 20 due to the permittivity of the dielectric substrate 10 is small because only dielectric portions, around the slots 30, of the dielectric substrate 10 are involved. Furthermore, the overall length of each straight slot 30 is necessarily shorter than the length of each side of the radiation electrode 20. As a result, the transmission/reception band of the slot antenna operation which is determined by the length of the slots 30 is higher than the transmission/reception band of the patch antenna operation which is determined by the external dimensions of the radiation electrode 20, above the mechanical dimension ratio.

For the above reasons, the transmission/reception band of the slot antenna operation cannot be made close to the transmission/reception band of the patch antenna operation.

An embodiment of the present invention relates to a slotted patch antenna capable of accommodating required transmission/reception bands by virtue of an increased degree of freedom of setting of the two transmission/reception bands.

Solution to Problem

A certain mode of the invention provides a slotted patch antenna. This slotted patch antenna includes a dielectric substrate, a radiation electrode which is provided on a major surface of the dielectric substrate, and a ground conductor which is disposed on a surface that is opposite to the major surface, wherein the radiation electrode is formed with a slot having a meandering portion, a curve portion, or a folded portion.

It is preferable that an external shape of the radiation electrode be a square, and totally two pairs of slots are formed inside the square, each of the slots being along respective sides of the square.

It is preferable that each of the slots is arranged so as to be line-symmetrical with respect to an axis of symmetry that is parallel with one of the sides of the square and passes through a center of the square, and to be point-symmetrical with respect to the center of the square.

Any combination of the above constituent elements and modes that are obtained by converting the expression of the invention into a method, a system, or the like are also effective as other modes of the invention.

Advantageous Effects of Invention

In the slotted patch antennas according to the invention, since the radiation electrode is formed with the slots each having a meandering portion, a curved portion, or a folded portion, the electrical length (in other words, effective wavelength) of each slot can be set longer than that of a conventional straight slot. As a result, the degree of freedom of setting of transmission/reception bands of the patch antenna operation and the slot antenna operation can be increased and it becomes possible to deal with required transmission/reception bands.

DESCRIPTION OF EMBODIMENTS

Figure 1:
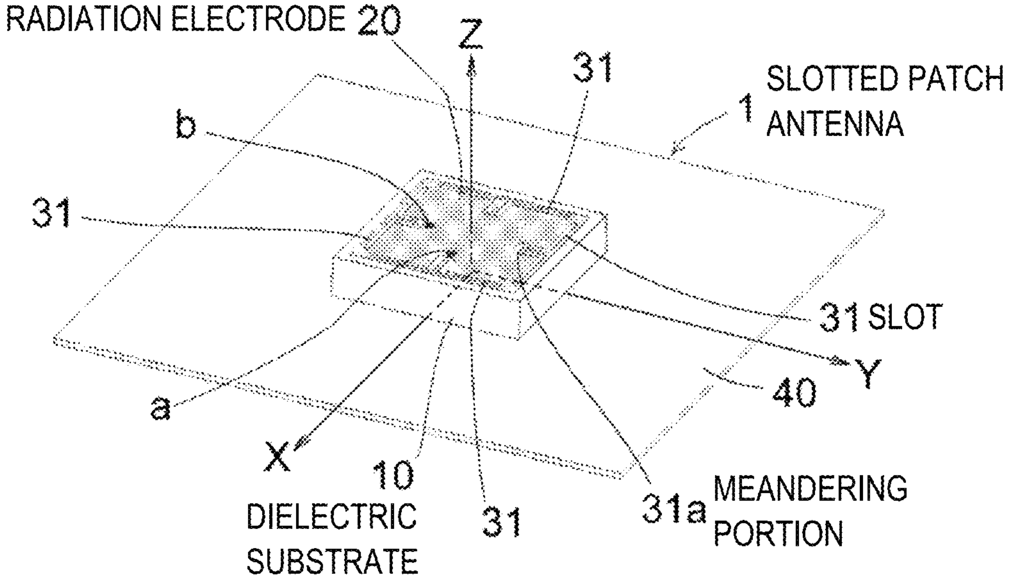
FIG. 1 is a perspective view showing a slotted patch antenna according to a first embodiment of the present invention.

Preferred embodiments of the present invention will be hereinafter described in detail with reference to the drawings. The same or equivalent constituent elements, members, kinds of treatment or working, etc. shown in the drawings are given the same symbol and redundant descriptions therefor will be omitted as appropriate. The embodiments are just examples and are not intended to restrict the invention, and not all of features and combinations thereof that will be described in each embodiment are essential to the invention.

Figure 2A:
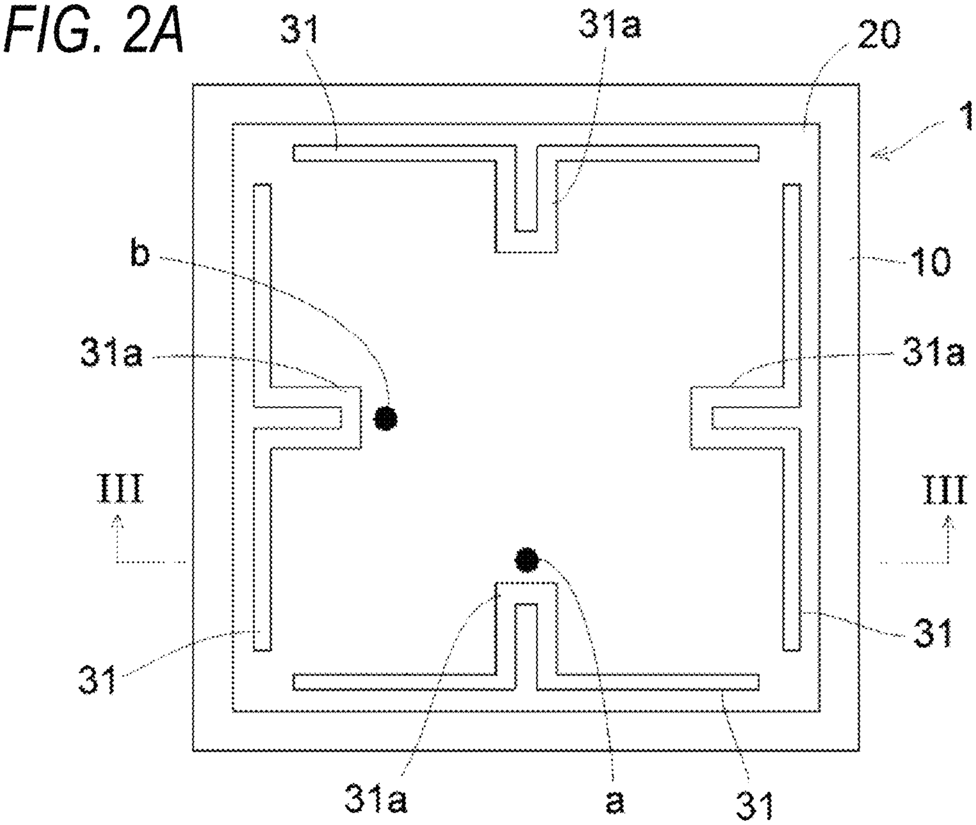
FIG. 2A is a plan view of the first embodiment with a ground plate omitted.

A slotted patch antenna according to a first embodiment of the invention will be described with reference to FIGS. 1-3. As shown in these drawings, the slotted patch antenna 1 is equipped with a square dielectric substrate 10, a square radiation electrode 20 which is a planar conductor provided on a major surface of the dielectric substrate 10, and a ground plate 40 (ground conductor) disposed on the surface opposite to the major surface. Furthermore, the radiation electrode 20 is formed with two pairs of slots 31. The slots 31 are portions where no conductor exists and each slot 31 is formed with a meandering portion 31*a* (a serpentine portion) approximately at the middle position of its straight-extending length. Four slots 31 are formed inside the square radiation electrode 20 along the respective sides of the square (in such a manner that confronting slots 31 except their meandering portions 31*a* are parallel with each other), and are arranged so as to be line-symmetrical with respect to the axis of symmetry that is parallel with each side of the square and passes through the center of the square and to be point-symmetrical with respect to the center of the square. In addition, slots 31 are located outside respective feeding points a and b when viewed from the center of the slotted patch antenna 1. As shown in FIG. 3, the radiation electrode 20 is fed with power at two points, that is, the feeding points a and b, via respective coaxial cables 25 and 26 (two-point feeding) so that circularly polarized waves can be transmitted and received efficiently.

In the first embodiment, in the patch antenna operation, the resonance frequency is a frequency at which an electrical length that is determined by the length of each side of the square radiation electrode 20 and the permittivity of the dielectric substrate 10 is equal to a ½ wavelength (or its integer multiple) and a frequency range including this resonance frequency is a first transmission/reception band.

In the slot antenna operation, each slot 31 has a meandering portion 31*a*, its overall length and electrical length is longer than in a case that it does not have a meandering portion 31*a*. Thus, the resonance frequency at which an electrical length that is determined by the overall length of each slot 31 and the permittivity of the dielectric substrate 10 is equal to a ½ wavelength (or its integer multiple) is decreased by providing the meandering portions 31*a*. As a result, a second transmission/reception band that is a frequency range including the resonance frequency of the slot antenna operation can be shifted toward the first transmission/reception band.

Figure 2B:
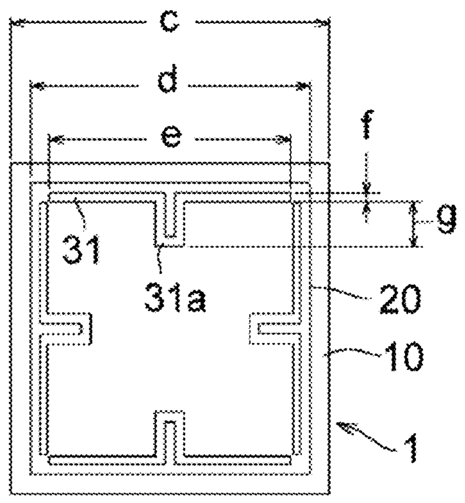
FIG. 2B is a plan view showing definitions of dimensions of the slotted patch antenna according to the first embodiment.
Figure 3:
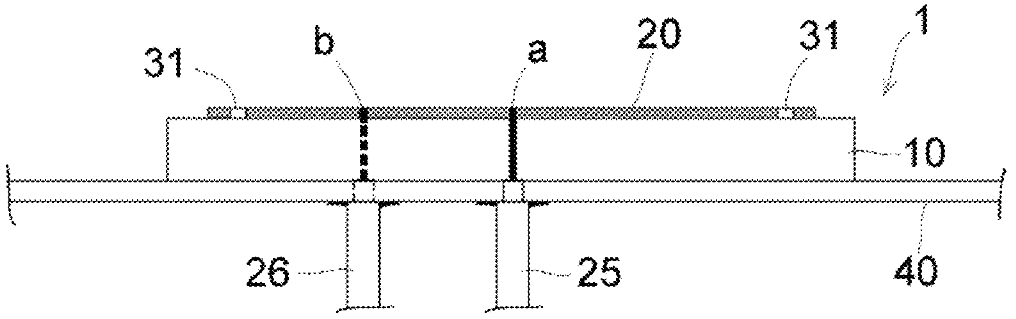
FIG. 3 is a sectional view taken along line III-III in FIG. 2A.
Figure 4:
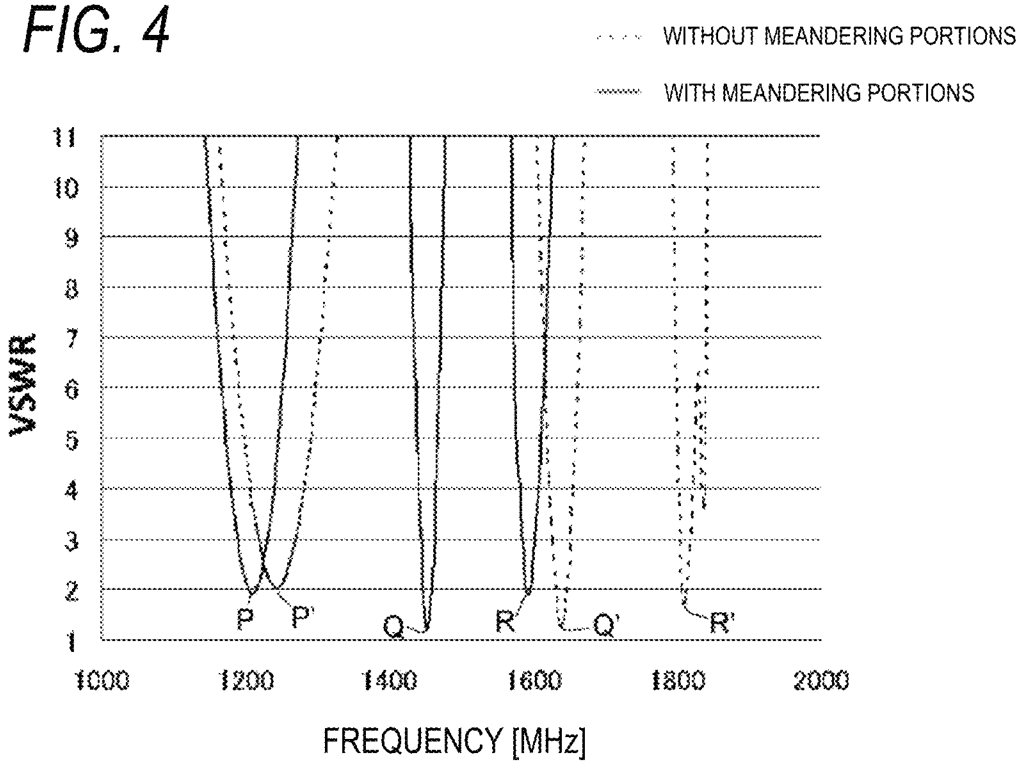
FIG. 4 is a VSWR (voltage standing wave ratio) frequency characteristic diagram that compares a transmission/reception band of the slot antenna operation of a conventional slotted patch antenna having no meandering portions with that of the slotted patch antenna according to the first embodiment of the invention having the meandering portions.
Figure 12:
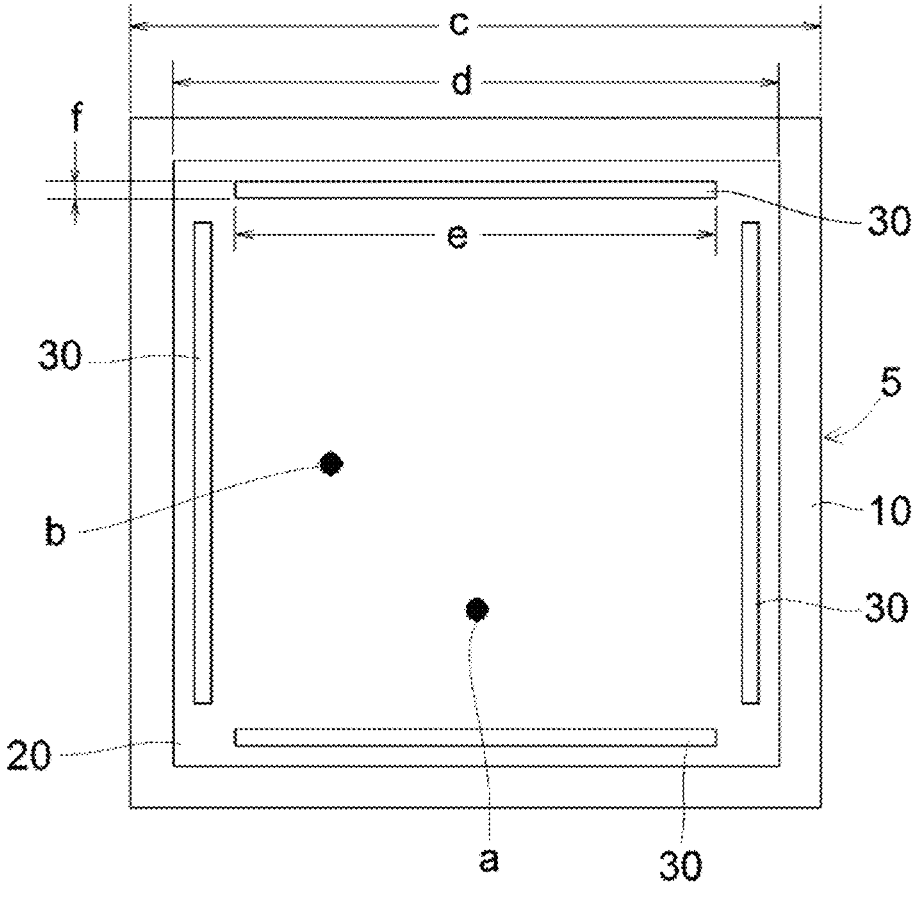
FIG. 12 is a plan view showing a conventional slotted patch antenna with its ground plate omitted.

FIG. 4 is a VSWR (voltage standing wave ratio) frequency characteristic diagram that compares a transmission/reception band of the slot antenna operation of a conventional slotted patch antenna having no meandering portions (FIG. 12) with that of the slotted patch antenna 1 according to the first embodiment of the invention having the meandering portions and dimensions defined in FIG. 2B. Referring to FIG. 2B (explaining definitions of dimensions) and FIG. 12, the VSWR (voltage standing wave ratio) frequency characteristic diagram of FIG. 4 corresponds to a case that the length c of each side of the square dielectric substrate 10 is 33 mm, the length d of each side of the square radiation electrode 20 is 29 mm, the length e of each slot 30 or 31 (in the case of each slot 31, the length excluding the meandering portion 31*a*) is 25 mm, the width f of each slot 30 or 31 is 0.8 mm, and the projection length g of each meandering portion 31*a* (see FIG. 2B) is 4.5 mm. It is seen that the transmission/reception band of the slot antenna operation of the slotted patch antenna is shifted to the lower frequency side because of the formation of the meandering portion in each slot. That is, as shown in FIG. 4, as for the slot antenna operation of the slotted patch antenna 1 according to the first embodiment (in the figure, broken-line curves represent characteristics without meandering portions and solid-line curves represent characteristics with the meandering portions), the resonance frequencies P', Q', and R' in a case that the meandering portions are not provided are changed to the resonance frequencies P, Q, and R in a case that the meandering portions are provided, that is, the resonance frequencies decrease.

Figure 5:
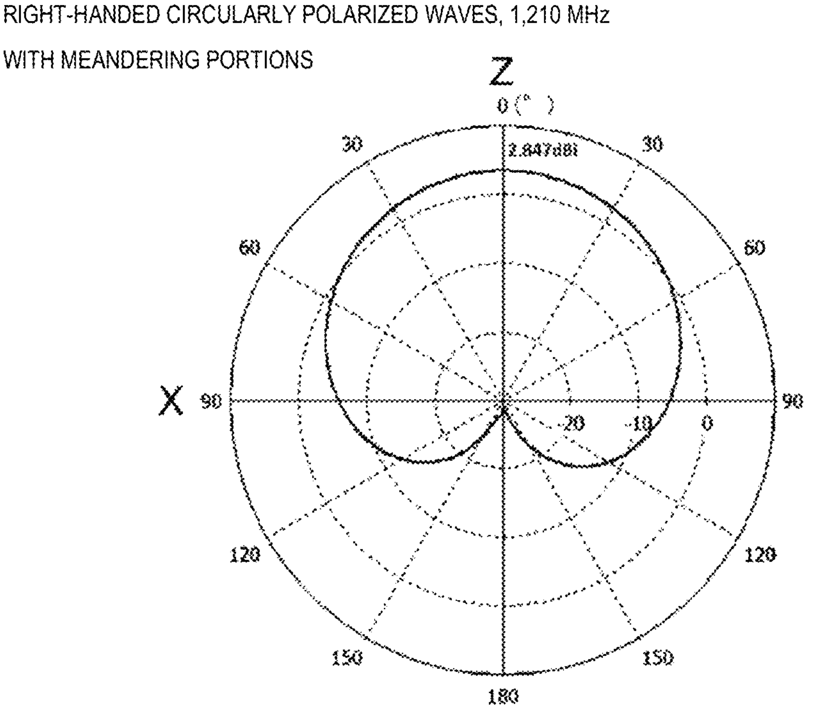
FIG. 5 is a directivity characteristic diagram in the X-Z plane of a patch antenna operation at 1,210 MHz in the first embodiment.
Figure 6:
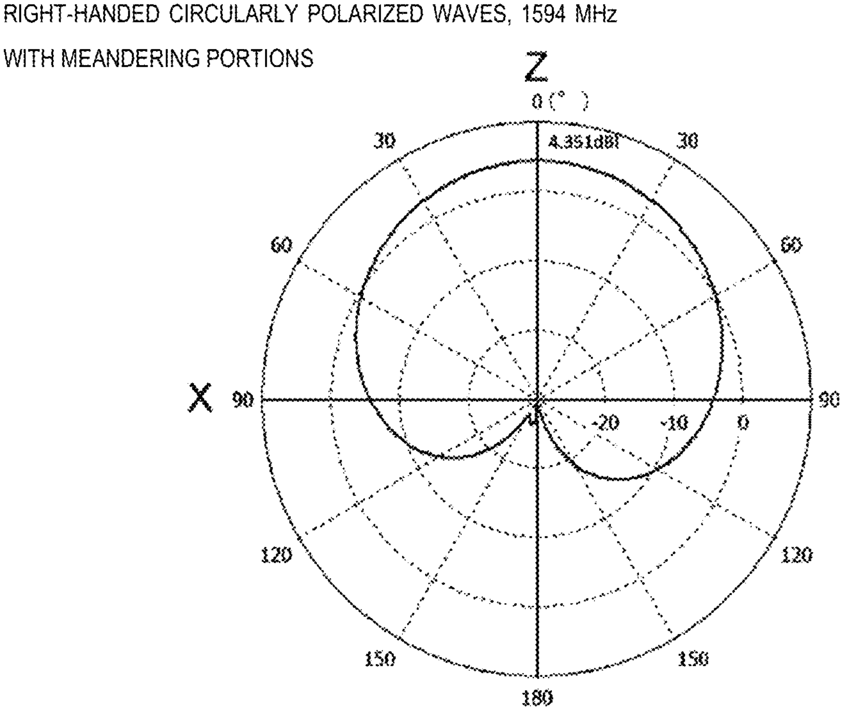
FIG. 6 is a directivity characteristic diagram in the X-Z plane of a slot antenna operation at 1,594 MHz in the first embodiment.

FIGS. 5-8 are directivity characteristics in the vertical plane for right-handed circularly polarized waves in the first embodiment (the definitions of the dimensions shown in FIG. 2B are applicable as in the case of FIG. 4). As shown in FIG. 1, the Z axis is set in the direction that is perpendicular to the ground plate 40 and passes through the center of the slotted patch antenna 1 (i.e., the center of the radiation electrode 20), the X axis is set in the direction that is in the plane of the ground plate 40 and is perpendicular to one side of the radiation electrode 20, and the Y axis is set in the direction that is in the plane of the ground plate 40 and is perpendicular to a side, adjacent to (perpendicular to) the above one side, of the radiation electrode 20. In FIGS. 5 and 6, Z=0° means the direction that goes directly upward from the radiation electrode 20 (i.e., opposite to the direction that goes from the radiation electrode 20 to the ground plate 40), Z=180° means the direction that goes directly downward from the radiation electrode 20 (i.e., the direction that goes from the radiation electrode 20 to the ground plate 40), and Z=90° means the X direction. FIG. 5 shows a directivity characteristic in the X-Z plane of a patch antenna operation at 1,210 MHz. This directivity characteristic is directed upward and broad. A gain at Z=0° is equal to 2.847 dBi. Likewise, FIG. 6 shows a directivity characteristic in the X-Z plane of a slot antenna operation at 1,594 MHz. This directivity characteristic is directed upward and broad. A gain at Z=0° is equal to 4.351 dBi.

Figure 7:
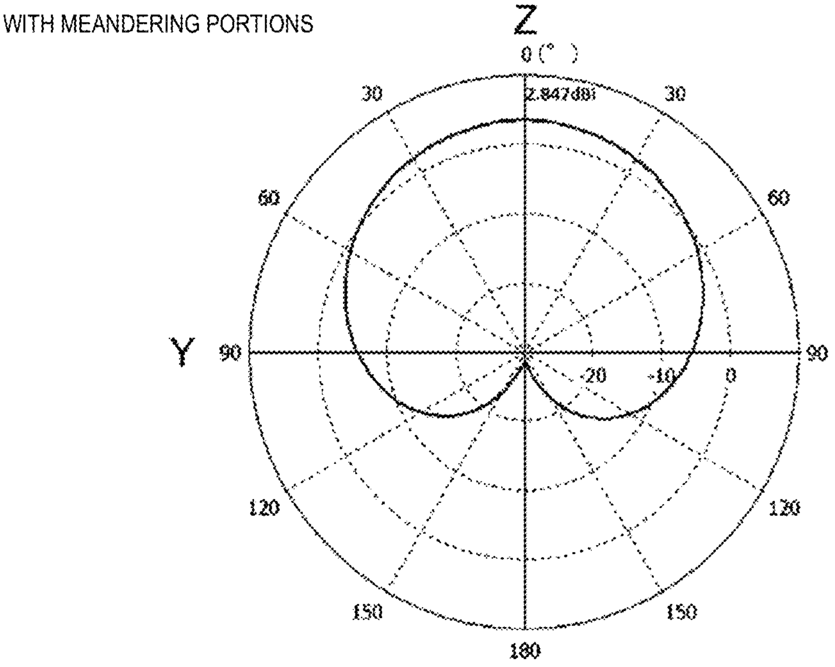
FIG. 7 is a directivity characteristic diagram in the Y-Z plane of a patch antenna operation at 1,210 MHz in the first embodiment.
Figure 8:
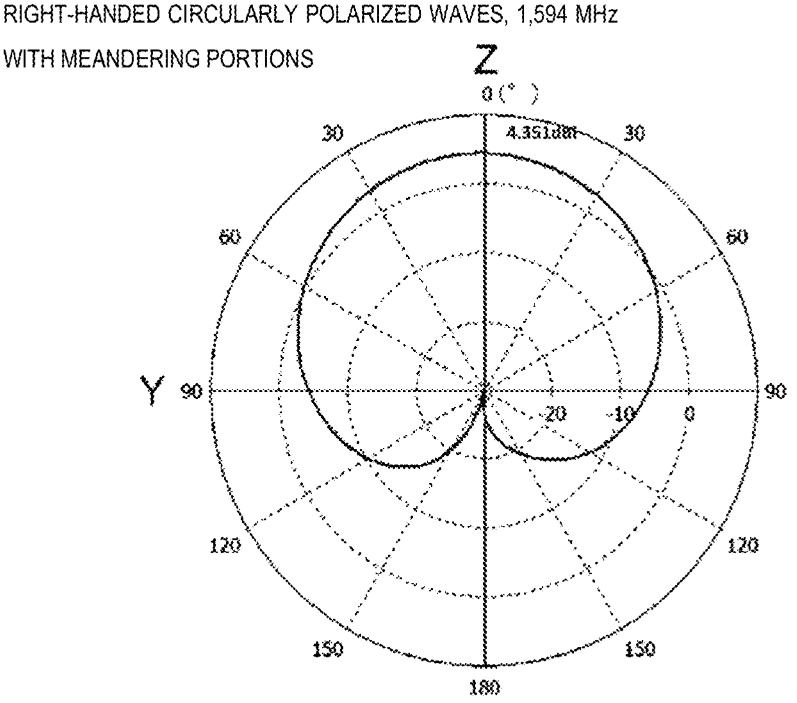
FIG. 8 is a directivity characteristic diagram in the Y-Z plane of a slot antenna operation at 1,594 MHz in the first embodiment.

In FIGS. 7 and 8, Z=0° means the direction that goes directly upward from the radiation electrode 20, Z=180° means the direction that goes directly downward from the radiation electrode 20, and Z=90° means the Y direction. FIG. 7 shows a directivity characteristic in the Y-Z plane of a patch antenna operation at 1,210 MHz. This directivity characteristic is directed upward and broad. A gain at Z=0° is equal to 2.847 dBi. Likewise, FIG. 8 shows a directivity characteristic in the Y-Z plane of a slot antenna operation at 1,594 MHz. This directivity characteristic is directed upward and broad. A gain at Z=0° is equal to 4.351 dBi.

This embodiment provides the following advantages.

(1) In the slotted patch antenna 1, since the meandering portion 31*a* is formed in each slot 31, the electrical length can be increased and the transmission/reception band of the slot antenna operation can be set lower than in the conventional case. As a result, the degree of freedom of setting of transmission/reception bands of the patch antenna operation and the slot antenna operation can be increased and it becomes possible to deal with required transmission/reception bands. For example, it is possible to deal with the 1.2 GHz band the 1.5 GHz band by the patch antenna operation and the slot antenna operation, respectively.

(2) The four slots 31 are formed inside the square radiation electrode 20 along the respective sides of the square (in such a manner that confronting slots 31 except their meandering portions 31*a* are parallel with each other), and are arranged so as to be line-symmetrical with respect to the axis of symmetry that is parallel with to each side of the square and passes through the center of the square and to be point-symmetrical with respect to the center of the square. As a result, circularly polarized waves can be transmitted and received properly in the case where at the feeding points a and b signals have a phase difference 90° and the same amplitude.

Figure 9:
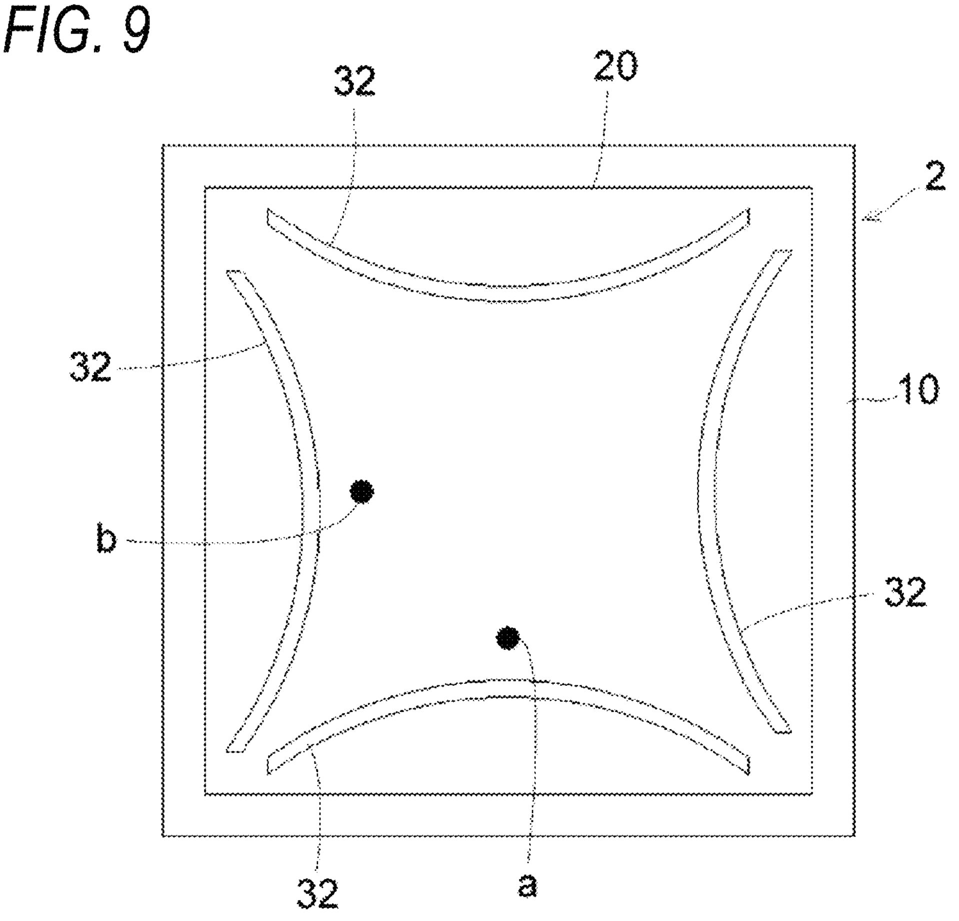
FIG. 9 is a plan view of a second embodiment of the invention with a ground plate omitted.

FIG. 9 shows a second embodiment of the invention. In a slotted patch antenna 2 according to this embodiment, a square radiation electrode 20 is formed with two pairs of slots 32 that are generally curved like a circular arc so as to be convex toward the center of the square. Four slots 32 are formed inside the square along the respective sides of the square. The slots 32 are arranged so as to be line-symmetrical with respect to the axis of symmetry that is parallel with one side of the square and passes through the center of the square and to be point-symmetrical with respect to the center of the square. The other part of the configuration is the same as in the above-described first embodiment.

In the second embodiment, the electrical length of each slot 32 can be made longer by forming the curved slots 32 in the radiation electrode 20, whereby substantially the same advantages as in the first embodiment can be obtained.

Figure 10:
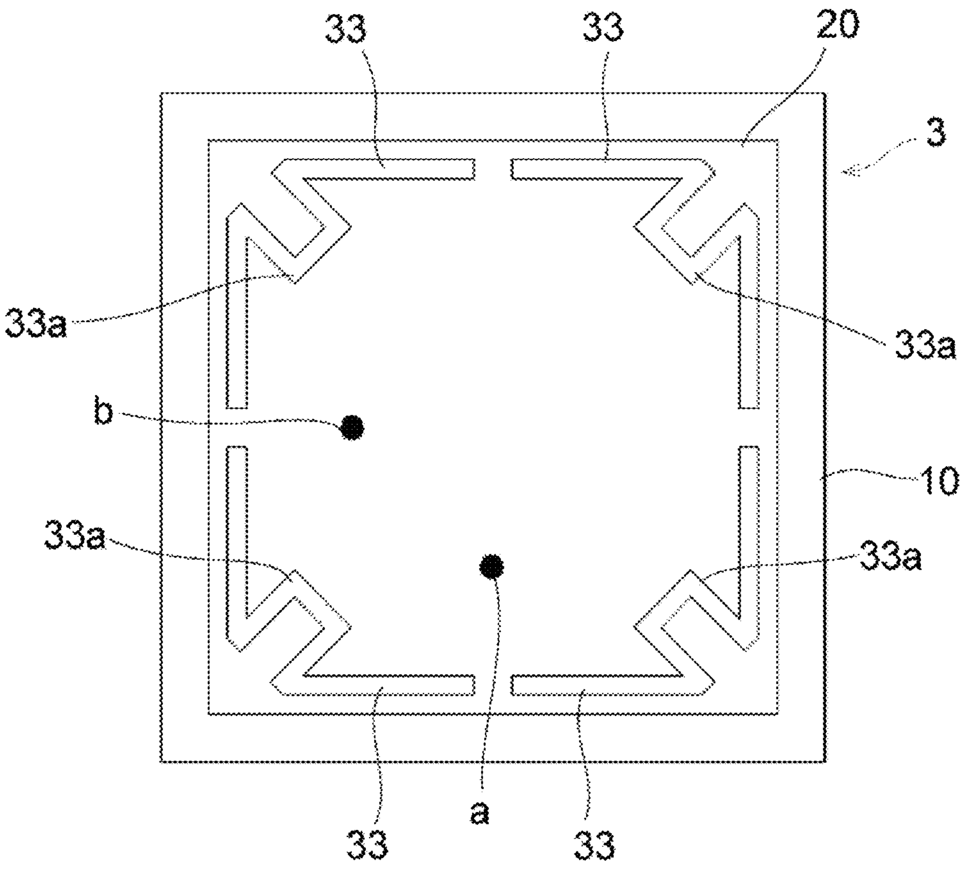
FIG. 10 is a plan view of a third embodiment of the invention with a ground plate omitted.

FIG. 10 shows a third embodiment of the invention. In a slotted patch antenna 3 according to this embodiment, a square radiation electrode 20 is formed with two pairs of slots 33 having meandering folded portions 33*a* in the vicinities of the corners of the square. The overall length of each slot 33 is longer than in a case without the meandering folded portion 33*a* because the meandering folded portion 33*a* is formed between a slot portion that is parallel with one side of the radiation electrode 20 and a slot portion that is parallel with the side that is perpendicular to the one side. Each slot 33 is formed inside the square along two sides of the square. The slots 33 are arranged so as to be line-symmetrical with respect to the axis of symmetry that is parallel with each side of the square and passes through the center of the square and to be point-symmetrical with respect to the center of the square. The other part of the configuration is the same as in the above-described first embodiment.

In the third embodiment, the electrical length of each slot 33 can be made longer by forming the slots 33 having the respective meandering folded portions 33*a* in the radiation electrode 20, whereby substantially the same advantages as in the first embodiment can be obtained.

Figure 11:
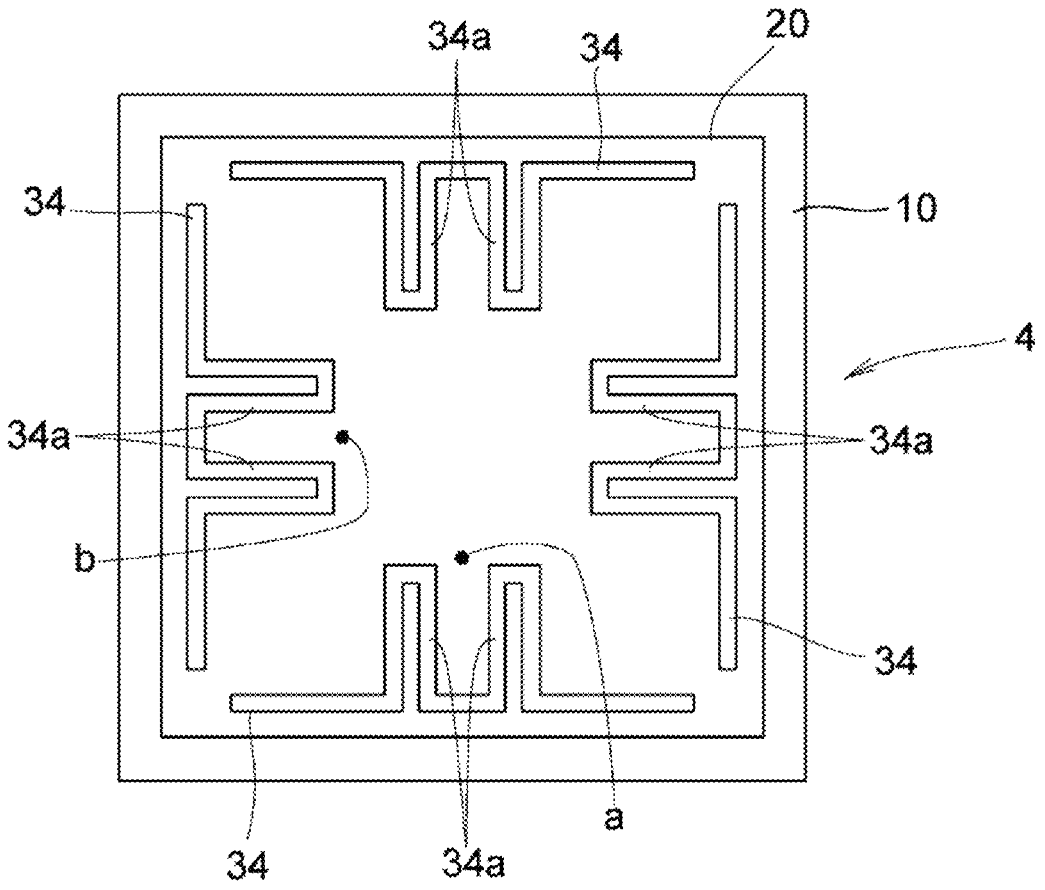
FIG. 11 is a plan view of a fourth embodiment of the invention with a ground plate omitted.

FIG. 11 shows a fourth embodiment of the invention. In a slotted patch antenna 4 according to this embodiment, a square radiation electrode 20 is formed with two pairs of slots 34. Each slot 34 is formed with two meandering portions 34*a* (serpentine portions) approximately at the middle position of its straight-extending length. Four slots 34 are formed inside the square along the respective sides of the square. The slots 34 are arranged so as to be line-symmetrical with respect to the axis of symmetry that is parallel with each side of the square and passes through the center of the square and to be point-symmetrical with respect to the center of the square. The other part of the configuration is the same as in the above-described first embodiment.

In the fourth embodiment, the electrical length of each slot 34*a* can be made longer by forming the slots 34 each having two meandering portions 34*a* in the radiation electrode 20, whereby substantially the same advantages as in the first embodiment can be obtained. Whereas each slot 31 of the first embodiment is formed with one meandering portion 31*a*, each slot 34 of the fourth embodiment is formed with two meandering portions 34*a*. Thus, where each slot 31 and each slot 34 are the same in electrical length, the length of each slot 34 measured along the one side (parallel with the straight-extending direction of the slot 34) of the radiation electrode 20 is shorter than the length of each slot 31 measured in the same manner. As a result, the patch antenna can be made smaller in the fourth embodiment than in the first embodiment. Furthermore, the radiation electrode 20 may be formed with slots each of which has three or more meandering portions (serpentine portions).

Although the invention has been described above using the embodiments as examples, it would be understood by those skilled in the art that each constituent element and each treatment or working process of each embodiment can be modified in various manners within the confines of the claims. Modifications will be described below.

Although the embodiments of the invention employ the slot shapes having a meandering portion (a serpentine portion) or a curved portion (the curved portion of each slot 32) directed to the center of the patch antenna, or a folded portion, a slot shape may be employed that has a meandering portion or a curved portion directed outward from the center of the patch antenna (in other words, the center of the radiation electrode), depending on desired frequency bands.

It is apparent that the invention can also be applied to the case of one-point feeding though the embodiments of the invention are directed to the case of two-point feeding, and that the power supply means is not limited to a coaxial cable.

DESCRIPTION OF SYMBOLS

1, 2, 3, 4, 5: Slotted patch antenna
10: Dielectric substrate
20: Radiation electrode
25, 26: Coaxial cable
30, 31, 32, 33, 34: Slot
31*a*, 34*a*: Meandering portion
33*a*: Meandering folded portion
40: Ground plate

The invention claimed is:

1. A slotted patch antenna comprising: a dielectric substrate;

a radiation electrode which is provided on a major surface of the dielectric substrate; and a ground conductor which is disposed on a surface that is opposite to the major surface, wherein the radiation electrode is formed with a plurality of slots including a meandering portion, and is fed with power at a plurality of feeding points, each of the slots includes one protrusion at the meandering portion, each of the feeding points is positioned close to a tip end of the protrusion of each of the slots, and a distance from each of the feeding points to the tip end of the protrusion of each of the slots is shorter than a length of the protrusion.

2. The slotted patch antenna according to claim 1 wherein an external shape of the radiation electrode is a square, and two pairs of slots are formed inside the square, each of the slots being along respective sides of the square.

3. The slotted patch antenna according to claim 2, wherein each of the slots is arranged so as to be line-symmetrical with respect to an axis of symmetry that is parallel with one of the sides of the square and passes through a center of the square, and each of the slots is arranged to be point-symmetrical with respect to the center of the square.

4. The slotted patch antenna according to claim 1, wherein the slotted patch antenna is configured to transmit and receive signals within the 1.5 GHz band by a slot antenna operation and transmit and receive signals within the 1.2 GHz band by a patch antenna operation.

5. A slotted patch antenna comprising: a dielectric substrate;

a radiation electrode which is provided on a major surface of the dielectric substrate; and a ground conductor which is disposed on a surface that is opposite to the major surface, wherein the radiation electrode is formed with a plurality of slots including a curved portion curved so as to convex toward an inside from an end portion of the radiation electrode, and is fed with power at a plurality of feeding points, each of the feeding points is positioned close to a tip end of the curved portion disposed most inside of the radiation electrode, and a distance from each of the feeding points to the tip end of the curved portion of each of the slots is shorter than a length from the end portion of the radiation electrode to the tip end of the curved portion.

* * * * *